（12） United States Patent
Kim (10) Patent No.: US 12,165,498 B2
(45) Date of Patent: Dec. 10, 2024

(54) SECURITY SURVEILLANCE MICROWAVE SENSOR HAVING REDUCED FALSE REPORT RATE BY MEANS OF BIOLOGICAL SIGNAL DETECTION

(71) Applicant: JCFTECHNOLOGY CO., LTD., Seoul (KR)

(72) Inventor: Jin Myung Kim, Bucheon-si (KR)

(73) Assignee: JCFTECHNOLOGY CO., LTD., Seoul (KR)

(*) Notice: Subject to any disclaimer, the term of this patent is extended or adjusted under 35 U.S.C. 154(b) by 113 days.

(21) Appl. No.: 17/775,534

(22) PCT Filed: Nov. 11, 2019

(86) PCT No.: PCT/KR2019/015254
§ 371 (c)(1),
(2) Date: May 9, 2022

(87) PCT Pub. No.: WO2021/095892
PCT Pub. Date: May 20, 2021

(65) Prior Publication Data
US 2022/0392334 A1 Dec. 8, 2022

(30) Foreign Application Priority Data
Nov. 11, 2019 (KR) .................. 10-2019-0143161

(51) Int. Cl.
*G08B 29/18* (2006.01)
*G01S 7/40* (2006.01)
(Continued)

(52) U.S. Cl.
CPC .......... *G08B 29/185* (2013.01); *G01S 7/4073* (2021.05); *G01S 13/583* (2013.01); *G01S 13/872* (2013.01); *G01S 13/886* (2013.01)

(58) Field of Classification Search
CPC .... G01S 7/4073; G01S 13/583; G01S 13/872; G01S 13/886; G08B 29/185
(Continued)

(56) References Cited

U.S. PATENT DOCUMENTS 4,511,897 A 4/1985 Lindner
9,958,542 B2 * 5/2018 Kuo .................. G01S 13/56
(Continued)

FOREIGN PATENT DOCUMENTS

JP 1999331065 A 11/1999
JP 2000338233 A 12/2000
(Continued)

OTHER PUBLICATIONS

International Search Report issued on Aug. 7, 2020, in connection with International Patent Application No. PCT/KR2019/015254, along with an English translation.
(Continued)

*Primary Examiner* — Zhen Y Wu
(74) *Attorney, Agent, or Firm* — NKL Law; Jae Youn Kim (57) ABSTRACT

The present invention relates to a security surveillance microwave sensor having a reduced false report rate by means of biological signal detection, which monitors and determines a malfunction state or a false alarm generated by environmental factors by detecting humans, animals or objects approaching within a predetermined distance using a microwave signal. The present invention may extend the monitoring distance of security surveillance, set an IF frequency band disturbed by a human body, amplify the IF frequency or use a change in the voltage level to extend the monitoring distance, manage a monitoring state by double-checking transmission and reception of security signals, and
(Continued)

reduce the false report rate by distinguishing the false alarms or the malfunction state of the sensor.

8 Claims, 5 Drawing Sheets

(51) Int. Cl.
    *G01S 13/58*     (2006.01)
    *G01S 13/87*     (2006.01)
    *G01S 13/88*     (2006.01)

(58) Field of Classification Search
    USPC .......................................................... 340/506
    See application file for complete search history.

(56) References Cited

U.S. PATENT DOCUMENTS

| | | | | |
|---|---|---|---|---|
| 10,810,866 | B2* | 10/2020 | Barth | G01S 13/867 |
| 11,080,974 | B2* | 8/2021 | Pantus | G01S 13/56 |
| 11,275,172 | B2* | 3/2022 | Kitamura | G01S 13/583 |
| 11,531,108 | B2* | 12/2022 | Heo | G01S 13/583 |
| 11,776,368 | B2* | 10/2023 | Pantus | G08B 29/185 |
| | | | | 342/28 |
| 2002/0044082 | A1* | 4/2002 | Woodington | H01Q 13/10 |
| | | | | 342/128 |
| 2007/0126582 | A1 | 6/2007 | Posamentier | |
| 2009/0294670 | A1* | 12/2009 | Tsuji | G08B 29/26 |
| | | | | 342/61 |
| 2013/0093616 | A1* | 4/2013 | Jeon | G01S 7/414 |
| | | | | 342/118 |
| 2018/0259620 | A1* | 9/2018 | Maher | G01S 13/06 |
| 2019/0302253 | A1* | 10/2019 | Santra | G01S 7/415 |
| 2020/0116850 | A1* | 4/2020 | Santra | A61B 5/0507 |
| 2020/0408878 | A1* | 12/2020 | Liang | G01S 7/354 |

FOREIGN PATENT DOCUMENTS

| | | |
|---|---|---|
| JP | 2009099020 A | 5/2009 |
| JP | 2010122968 A | 6/2010 |
| JP | 2014228445 A | 12/2014 |
| JP | 2015072224 A | 4/2015 |
| JP | 2016011938 A | 1/2016 |
| KR | 1019950703158 A | 8/1995 |
| KR | 10-2005-0048809 A | 5/2005 |
| KR | 10-1271385 B1 | 6/2013 |
| KR | 1020150098330 A | 8/2015 |
| KR | 1020150100200 A | 9/2015 |
| KR | 1020160039358 A | 4/2016 |
| KR | 101697542 B1 | 1/2017 |
| KR | 10-2017-0113135 A | 10/2017 |
| KR | 1020180100293 A | 9/2018 |
| KR | 10-2018-0110821 A | 10/2018 |
| KR | 10-2019-0021906 A | 3/2019 |
| WO | 2010132850 A1 | 11/2010 |

OTHER PUBLICATIONS

Written Opinion issued on Aug. 7, 2020, in connection with International Patent Application No. PCT/KR2019/015254.

Changzhi Li et al., "Random Body Movement Cancellation in Doppler Radar Vital Sign Detection," IEEE Transactions on Microwave Theory and Techniques, Dec. 2008, vol. 56, No. 12, pp. 3143-3152; cited in NPL Nos. 1 and 2.

* cited by examiner

| Second Doppler radar | | Determination | Remarks |
|---|---|---|---|
| DC1 | DC2 | State | Result |
| High | High | Normal | Monitoring target object approaches |
| High | Low | Normal | |
| Middle | High | Normal | Monitoring target object exists in alarm zone |
| Middle | Low | Normal | Monitoring target object approaches |
| Low | High | Intrusion | |
| Low | Low | False alarm | Malfunction of sensor |

| Third Doppler radar | | Fourth Doppler radar | | Determination | Remarks |
|---|---|---|---|---|---|
| DC1 | DC2 | DC3 | DC4 | State | Result |
| High | Low | High | Low | Normal | |
| High | Low | High | High | Normal | |
| High | High | High | Low | Normal | Monitoring target object approaches second Doppler radar |
| High | High | High | High | Normal | Monitoring target object approaches first Doppler radar |
| Low | High | Low | Low | Intrusion | Monitoring target object approaches |
| Low | Low | Low | High | Intrusion | |
| Low | High | Low | High | Intrusion | |
| Low | Low | Low | Low | False alarm | Malfunction of sensor |
| Other situations | | | | | Determine measures after monitoring |

SECURITY SURVEILLANCE MICROWAVE SENSOR HAVING REDUCED FALSE REPORT RATE BY MEANS OF BIOLOGICAL SIGNAL DETECTION

CROSS-REFERENCE TO RELATED APPLICATION

The present application is a national stage filing under 35 U.S.C § 371 of PCT application number PCT/KR2019/015254 filed on Nov. 11, 2019 which is based upon and claims the benefit of priorities to Korean Patent Application Nos. 10-2019-0143161 filed on Nov. 11, 2019 in the Korean Intellectual Property Office. The disclosures of the above-listed applications are hereby incorporated by reference herein in their entireties.

TECHNICAL FIELD

The present invention relates to a security surveillance sensor, and more particularly, to a security surveillance microwave sensor having a reduced false report rate by means of biological signal detection, which monitors and determines a false alarm or a malfunction state caused by environmental factors by detecting humans, animals or objects approaching within a predetermined distance using microwave signals.

BACKGROUND ART

Generally, a security system is installed to protect life and property from various crimes that may occur due to unauthorized contact or intrusion from the outside into places or spaces that require protection of human life and property. Various sensors are installed in such a security system to detect intrusion from the outside.

A sensor detects external stimuli or signals, which is a device that detects external signals or dangerous signals that are difficult for human sensory organs to detect and converts the signals into electrical signals. Such sensors are diversely used around us, like endoscopes, stethoscopes, thermometers, X-ray cameras, magnetic resonance imaging (MRI) device, infrared cameras, and the like. The endoscope uses light to show inside the stomach or intestines, and the stethoscope provides information such as heartbeat, respiration, blood circulation, and the like through the sound. The thermometer may measure body temperature using heat, and the X-ray camera or the magnetic resonance imaging device uses electromagnetic waves to indirectly show a condition inside the body that cannot be seen even with an endoscope. The infrared camera converts infrared light emitted from an object into visible light that can be seen to allow a user to see surroundings better.

In addition, as one of sensing techniques, radar may accurately measure an exact distance to an object and a relative speed of the object with respect to an observation point. Radar devices usually operate by emitting electromagnetic waves of microwave level to an object and receiving the electromagnetic waves reflected from the object. A processed signal is converted into a form that can be used by an operator or peripherals controlled by the radar. Information on a target object is displayed on the screen of a cathode ray tube. The most widely used pulse radar transmits radio energy in the form of very strong pulse. As continuous-wave radar transmits transmission signals in a continuous form rather than a short pulse, echoes thereof are also continuously received. Although simple continuous-wave radar is unable to measure a distance, more sophisticated frequency-modulated radar may measure the distance. Light radar emits laser light having a very narrow width instead of a radio frequency.

In addition, Doppler radar uses the Doppler effect of radio waves to detect a moving target based on the difference between the frequency of radar waves transmitted toward a target object and the frequency of reflected radio waves. It is used for weather radar, self-contained navigation systems of aircrafts, and military radar. For meteorological purpose, a change in the speed of wind generated inside a cloud is measured. The self-contained navigation system calculates a current position by measuring the speed of radio waves reaching the ground. Pulse Doppler radar, which generally uses a single pulse signal to capture and track only a target moving in the reflected waves on the surfaces of the ground and the sea, is the mainstream of military radar.

Figure 1:
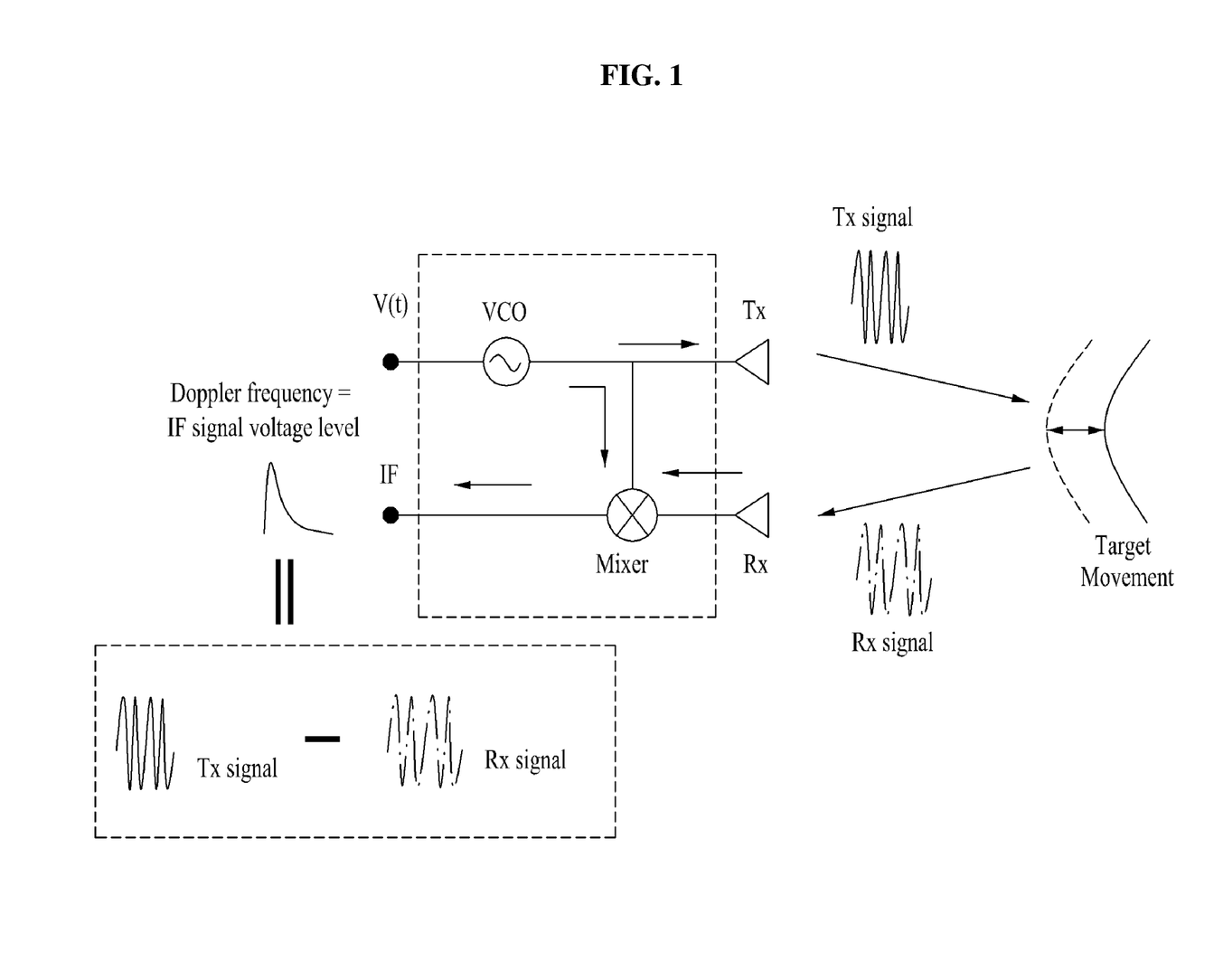
FIG. 1 is a view showing the operation of a conventional Doppler radar.

In the conventional Doppler radar having a transceiver structure as shown in FIG. 1, a microwave signal of, for example, 24 to 24.25 GHz generated by the VCO in the transceiver is output through the Tx antenna, and the output microwave signal is reflected by a target such as a human body or an object and received through the Rx antenna. In addition, when the target moves, the signal received through the Rx antenna is converted into an arbitrary Doppler shift frequency signal by shifting the Tx signal relatively according to the moving speed of the target, and the shifted frequency signal is received through the Rx antenna. Therefore, as the frequency signal of the VCO and the received frequency signal pass through the mixer inside the transceiver, the difference between the two signals is detected as a Doppler signal, and this is transferred to the signal processing circuit as an IF (baseband) signal of a specific voltage level. At this point, the Doppler signal detected as an IF signal is generated by the movement of a different voltage level only while the target is moving, and when the movement disappears, the IF signal also becomes 0.

Conventional infrared sensors mainly used for detecting movement of a human body or an object have a problem of a short sensing distance, a low response speed, a high false report rate due to interference or disturbance of fog, leaves, tree branches, birds, insects, temperature, sunlight, or the like, and a narrow error range of setup. In addition, since conventional Doppler radar needs to process a received signal in the process of sensing signals in order to use a modulation signal for long-distance radio transmission or use a Doppler signal as it is, there is a problem in that software should be used while very complex circuits and expensive parts are used at the receiving side.

As a prior art related to the present invention, the motion sensing device using Doppler radar of Patent Document 1 discloses a configuration including a signal processor for receiving a Doppler signal through the Doppler radar, and calculating an average power value of frequency components included in the Doppler signal, and a motion determiner for receiving an average power value, which is calculated for each of a plurality of Doppler signals continuously received through the Doppler radar, from the signal processor, analyzing changes in the average power value over time, and determining a movement type of a reflector.

PRIOR ART DOCUMENT

Patent Document (Patent Document 1) Korean Patent Publication No. 10-2019-0021906 (published on Mar. 6, 2019)

DISCLOSURE OF INVENTION

Technical Problem

An object of the present invention is to monitor and determine a false alarm or a malfunction state caused by environmental factors by detecting a biological signal of an object intruding from a set straight distance using a pair of transmitter and receiver in a Doppler radar transceiver structure.

In addition, another object of the present invention is to reduce manufacturing cost and improve usability by simplifying the circuit together with improving the false report rate.

Technical Solution

To accomplish the above objects, according to one aspect of the present invention, there is provided a first voltage-controlled oscillator VCO1 for generating and outputting an oscillation frequency f1 of a predetermined period using a voltage V applied from the outside, and the oscillation frequency generated by the first voltage-controlled oscillator is amplified. To accomplish the above objects, there is provided a security surveillance microwave sensor having a reduced false report rate by means of biological signal detection, the sensor comprising: a first Doppler radar configured of a transmitter for generating an oscillation frequency of a predetermined period using a voltage applied from the outside, amplifying the generated oscillation frequency to a predetermined magnitude, and transmitting the oscillation frequency to the outside through a first transmission antenna; and a second Doppler radar configured of a transceiver including a radar transceiver for generating an oscillation frequency of a predetermined period using a voltage applied from the outside, amplifying the generated oscillation frequency to a predetermined magnitude, and transmitting and receiving signals transmitted from the first transmission antenna and a second transmission antenna through a first reception antenna, a security signal processing unit for processing a security surveillance IF signal transmitted from the first transmission antenna and received through the first reception antenna, converting the IF signal to a first DC voltage level of a predetermined magnitude, and outputting the signal, a human body detection signal processing unit for processing a Doppler IF signal generated by a wave signal transmitted from the second transmission antenna, reflected by a detection target object approaching a monitoring area, and received through the first reception antenna of the radar transceiver, converting the IF signal to a second DC voltage level of a predetermined magnitude, and outputting the signal, and a comparison unit for comparing the first DC voltage level input from the security signal processing unit with the second DC voltage level input from the human body detection signal processing unit, and outputting a result value, wherein the first reception antenna receives the signal transmitted from the first transmission antenna by way of a monitoring distance d within a predetermined monitoring area and the signal transmitted from the second transmission antenna and reflected by a monitoring target object within a predetermined monitoring area, and the security signal processing unit and the human body detection signal processing unit process the signals, detect a monitoring target object that approaches or maintains a fine movement or a standstill state, and determine malfunction of the sensor.

In addition, in the present invention, the security surveillance microwave sensor may further comprise a determination means for determining an abnormal state, on the basis of a value output from the comparison unit by comparing the first DC voltage level with the second DC voltage level, and the first DC voltage level input from the security signal processing unit.

In addition, in the present invention, the determination means determines a monitoring state on the basis of the result value input from the comparison unit, wherein the determination means may determine the monitoring state as approach of the monitoring target object when the first DC voltage level is high and the second DC voltage level is high, as a normal monitoring state when the first DC voltage level is high and the second DC voltage level is low, as a state in which the monitoring target object exists in a monitoring area when the first DC voltage level is middle and the second DC voltage level is high, as a normal monitoring state when the first DC voltage level is middle and the second DC voltage level is low, as intrusion of the monitoring target object when the first DC voltage level is low and the second DC voltage level is high, and as a false alarm caused by malfunction of the sensor when the first DC voltage level is low and the second DC voltage level is low.

In addition, in the present invention, the radar transceiver may include a filter for filtering the security surveillance IF signal and the Doppler IF signal to pass through a predetermined band, respectively.

According to another aspect of the present invention, there is provided a security surveillance microwave sensor having a reduced false report rate by means of biological signal detection, the sensor comprising: a first Doppler radar configured of a first transceiver including: a first radar transceiver for generating an oscillation frequency of a predetermined period using a voltage applied from the outside, amplifying the generated oscillation frequency to a predetermined magnitude, transmitting the oscillation frequency to the outside through a first transmission antenna, and transmitting and receiving a radio wave signal transmitted from the first transmission antenna and reflected by a detection target object and a signal transmitted from a second transmission antenna of a second transceiver through a first reception antenna, a first security signal processing unit for processing a security surveillance IF signal transmitted from the second transmission antenna of the second radar transceiver of the second transceiver and received through the first reception antenna of the first radar transceiver, converting the IF signal to a first DC voltage level of a predetermined magnitude, and outputting the signal, a first human body detection signal processing unit for processing a Doppler IF signal generated by a wave signal transmitted from the first transmission antenna, reflected by a detection target object approaching a monitoring area, and received through the first reception antenna of the first radar transceiver, converting the IF signal to a second DC voltage level of a predetermined magnitude, and outputting the signal, and a first comparison unit for comparing the first DC voltage level input from the first security signal processing unit with the second DC voltage level input from the first human body detection signal processing unit, and outputting a result value; and a second Doppler radar configured of a second transceiver including: a second radar transceiver for generating an oscillation frequency of a predetermined period using a voltage applied from the outside, amplifying the generated oscillation frequency to a predetermined magnitude, transmitting the oscillation frequency to the outside through the second transmission antenna, and transmitting and receiving a reflected wave signal transmitted from the second transmission antenna and reflected by a detection target object and a signal transmitted from the first transmission antenna of the first transceiver through a second reception antenna, a second security signal processing unit for processing a security surveillance IF signal transmitted from the first transmission antenna of the first transceiver and received through the second reception antenna of the second radar transceiver, converting the IF signal to a third DC voltage level of a predetermined magnitude, and outputting the signal, a second human body detection signal processing unit for processing a Doppler IF signal generated by a wave signal transmitted from the second transmission antenna, reflected by the detection target object approaching a monitoring area, and received through the second reception antenna of the second radar transceiver, converting the IF signal to a fourth DC voltage level of a predetermined magnitude, and outputting the signal, and a second comparison unit for comparing the third DC voltage level input from the second security signal processing unit with the fourth DC voltage level input from the second human body detection signal processing unit, and outputting a result value, wherein in order to allow the first human detection signal processing unit and the second human body detection signal processing unit to detect a Doppler IF signal of the detection target object in the monitoring distance d within a predetermined monitoring area, the first reception antenna and the second reception antenna receive signals transmitted from the first transmission antenna and the second transmission antenna by way of a monitoring distance d within a predetermined monitoring area, and signals transmitted from the first transmission antenna and the second transmission antenna and reflected by a monitoring target object within a predetermined monitoring area, and the first security signal processing unit and the first human body detection signal processing unit, and the second security signal processing unit and the second human body detection signal processing unit process the signals, detect a monitoring target object that approaches or maintains a fine movement or a standstill state, and determine malfunction of the sensor.

In addition, in the present invention, the security surveillance microwave sensor may further comprise: a first determination means for determining an abnormal state, on the basis of a value output from the first comparison unit by comparing the first DC voltage level with the second DC voltage level, and the first DC voltage level input from the first security signal processing unit; and a second determination means for determining an abnormal state, on the basis of a value output from the second comparison unit by comparing the third DC voltage level with the fourth DC voltage level, and the third DC voltage level input from the second security signal processing unit.

In addition, in the present invention, the first determination means determines a monitoring state on the basis of the result value input from the first comparison unit, the second determination means determines a monitoring state on the basis of the result value input from the second comparison unit, wherein the first determination means and the second determination means may determine the monitoring state as a normal monitoring state when the first DC voltage level is high, the second DC voltage level is low, the third DC voltage level is high, and the fourth DC voltage level is low, as approach of the monitoring target object to the second Doppler radar when the first DC voltage level is high, the second DC voltage level is low, the third DC voltage level is high, and the fourth DC voltage level is high, as approach of the monitoring target object to the first Doppler radar when the first DC voltage level is high, the second DC voltage level is high, the third DC voltage level is high, and the fourth DC voltage level is low, as approach of the monitoring target object when all the first to fourth DC voltage levels are high, as intrusion of the monitoring target object when the first DC voltage level is low, the second DC voltage level is high, the third DC voltage level is low, and the fourth DC voltage level is low, and as a false alarm caused by malfunction of the sensor when all the first to fourth DC voltage levels are low.

In addition, in the present invention, the first radar transceiver and the second radar transceiver may include a filter for filtering the security surveillance IF signal and the Doppler IF signal to pass through a predetermined band, respectively.

Advantageous Effects

According to the present invention, there are advantageous effects of overcoming the disadvantages of conventional microwave sensors of using software while using very complex circuits and expensive parts in the receiver in order to use a modulation signal or use a Doppler signal as it is, implementing a sensor of an equal or higher level only by simply inserting a circuit without configuring software by using an RF transceiver module, further extending a monitoring distance and performing security surveillance by installing a first Doppler radar and a second Doppler radar as a pair to detect human bodies and process security signals, setting a specific IF frequency band disturbed by a human body, simply amplifying the IF frequency, or converting change in the voltage level (peak to peak) into displacement of a DC voltage in order to extend the monitoring distance d, precisely managing a monitoring state by double-checking so that the pair of sensors may transmit and receive security signals to and from each other by extending the monitoring distance, and further reducing a false report rate compared with existing microwave sensors by further distinguishing a false alarm or a malfunction state of the sensor.

BEST MODE FOR CARRYING OUT THE INVENTION

Hereinafter, a first embodiment of a security surveillance microwave sensor having a reduced false report rate by means of biological signal detection according to the present invention will be described below in detail with reference to the accompanying drawings.

Figure 2:
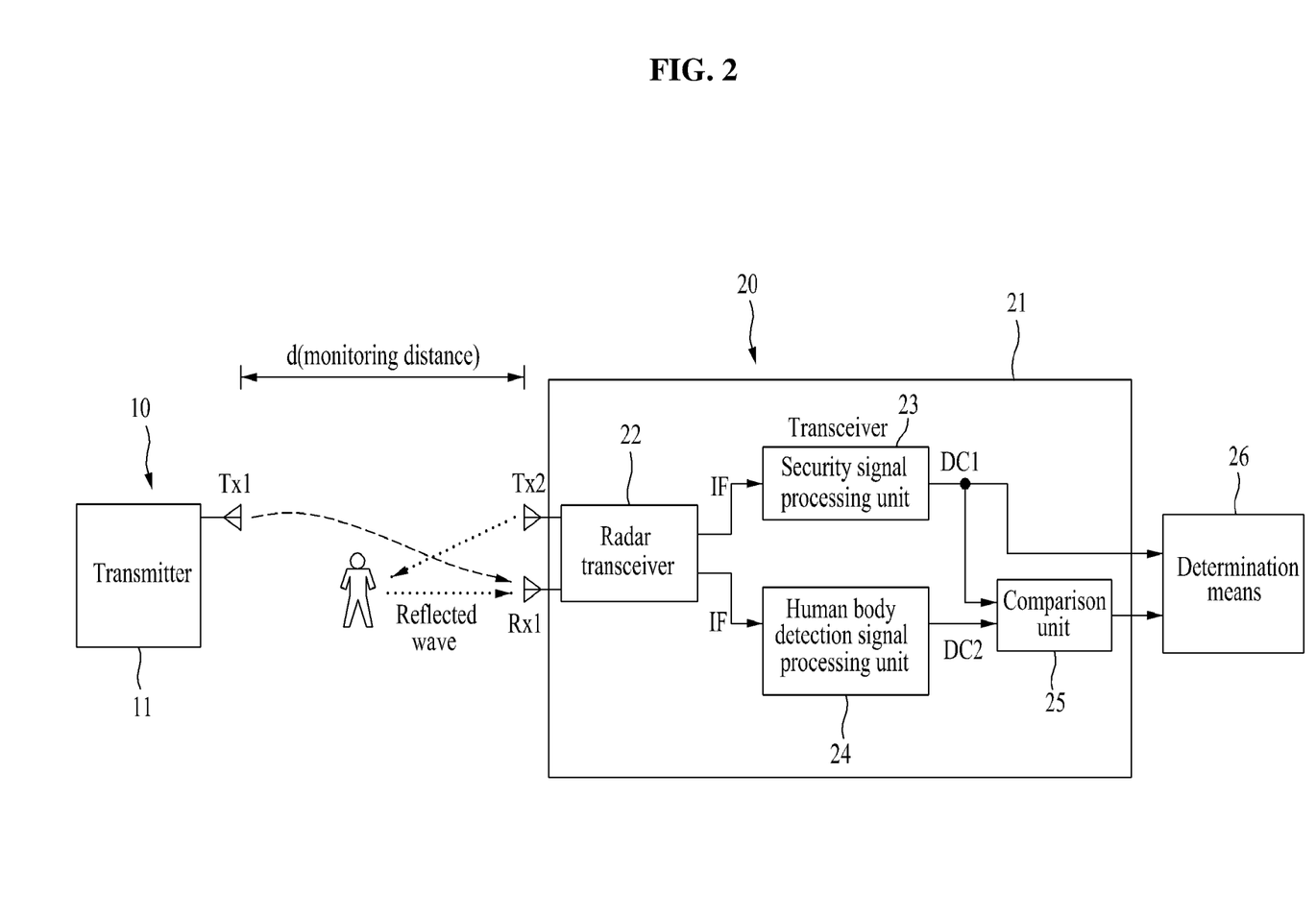
FIG. 2 is a block diagram showing a security surveillance microwave sensor having a reduced false report rate by means of biological signal detection as a first embodiment according to the present invention.

In FIG. 2, a first Doppler radar 10 and a second Doppler radar 20 are installed to be spaced apart from each other by a monitoring distance d set within a predetermined range for transmitting and receiving microwave frequencies. The first Doppler radar 10 and the second Doppler radar 20 are preferably installed to face each other.

The first Doppler radar 10 is configured of a transmitter 11 for generating an oscillation frequency of a predetermined period using a voltage applied from the outside, amplifying the generated oscillation frequency to a predetermined magnitude, and transmitting the oscillation frequency to the outside through a first transmission antenna Tx1.

The second Doppler radar 20 installed to correspond to the first Doppler radar 10 is configured of a transceiver 21 for transmitting and receiving an oscillation frequency. A radar transceiver 22 of the second Doppler radar 20 generates an oscillation frequency of a predetermined period using a voltage applied from the outside, amplifies the generated oscillation frequency to a predetermined magnitude, and transmits the oscillation frequency to the outside through a second transmission antenna Tx2. Then, the transceiver 21 transmits and receives the signals transmitted from the first transmission antenna Tx1 of the first Doppler radar 10 and the second transmission antenna Tx2 of the second Doppler radar 20 through the first reception antenna Rx1.

In addition, a security signal processing unit 23 processes a security surveillance IF signal transmitted from the first transmission antenna Tx1 and received through the first reception antenna Rx1 of the radar transceiver 22, converts the IF signal to a first DC voltage level of a predetermined magnitude, and outputs the signal. In addition, a human body detection signal processing unit 24 processes a Doppler IF signal generated by a wave signal transmitted from the second transmission antenna Tx2, reflected by a detection target object approaching a monitoring area, and received through the first reception antenna Rx1 connected to the radar transceiver 22, converts the IF signal to a second DC voltage level of a predetermined magnitude, and outputs the signal. Furthermore, the radar transceiver 22 includes a filter for filtering the security surveillance IF signal and the Doppler IF signal to pass through a predetermined band, respectively.

A comparison unit 25 of the second Doppler radar 20 compares the first DC voltage level input from the security signal processing unit 23 with the second DC voltage level input from the human body detection signal processing unit 24, and output a result value thereof.

In addition, a determination means 26 is configured in the transceiver 21 of the second Doppler radar 20, and the determination means 26 determines a normal operating state or an abnormal state of the security surveillance microwave sensor, on the basis of a value output from the comparison unit 25 by comparing the first DC voltage level with the second DC voltage level, and the first DC voltage level input from the security signal processing unit 23.

Furthermore, it will be possible to generate an alarm or perform monitoring according to intrusion, approach, or passage of an intruder within a monitoring area based on the signals that the determination means 26 receives, for a person in charge of a security surveillance control center or the like.

The operation of the security surveillance microwave sensor having a reduced false report rate by means of biological signal detection according to a first embodiment of the present invention configured as described above will be described.

First, an oscillated frequency signal is transmitted from the first transmission antenna Tx1 of the first Doppler radar by way of a monitoring distance d within a predetermined monitoring area. The signal transmitted from the first transmission antenna Tx1 is received through the first reception antenna Rx1 of the second Doppler radar 20. In addition, the signal transmitted from the second transmission antenna Tx2 of the second Doppler radar 20 is reflected by the monitoring target object within a predetermined monitoring area, and received through the first reception antenna Rx1. At this point, the frequency signals received from the first transmission antenna Tx1 and the second transmission antenna Tx2 through the first reception antenna Rx1 of the second Doppler radar 20 are filtered by the filter in the radar transceiver 22, respectively. Generally, a Doppler IF signal from a human body, an animal, or an object moving at a speed of 100 Km/h or less has a characteristic of about several hundred Hz or less. Since the frequency deviation from a arbitrarily set security surveillance IF signal is large, the two signals may be easily separated by a filter of a corresponding band.

The security surveillance IF signal separated by the radar transceiver 22 is processed by the security signal processing unit 23, and then converted and output as a first DC voltage level, and the Doppler IF signal reflected by a human body, an animal, or an object approaching the monitoring area is processed by the human body detection signal processing unit 24 and then converted and output as a second DC voltage level.

Therefore, in the transceiver 21 of the second Doppler radar 20, when the security signal processing unit 23 and the human body detection signal processing unit 24 process the signals received through the first reception antenna Rx1 and output the signals as a first DC voltage level and a second DC voltage level, the determination means 26 may detect a monitoring target object approaching between the first Doppler radar 10 and the second Doppler radar 20 or determine malfunction of the sensor.

Figure 3:
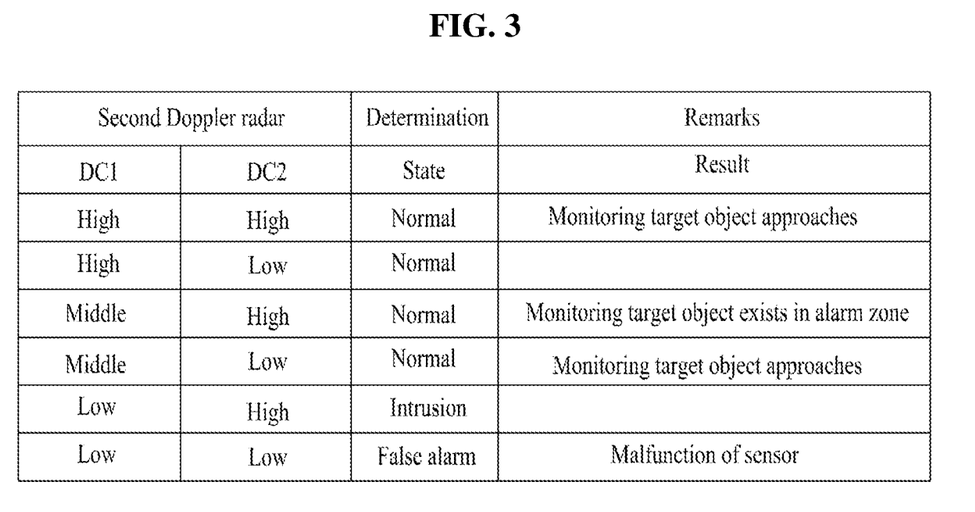
FIG. 3 is a table showing a result of determining a monitoring state by a determination means based on a DC voltage level output from a comparator in a security surveillance microwave sensor having a reduced false report rate by means of biological signal detection according to the present invention.

In FIG. 3, the determination means 26 determines a monitoring state on the basis of a result value input from the comparison unit 25. That is, when the first DC voltage level is high and the second DC voltage level is high, the determination means 26 determines that a monitoring target object is approaching. In addition, when the first DC voltage level is high and the second DC voltage level is low, the determination means 26 determines that the monitoring state is normal. In addition, when the first DC voltage level is middle and the second DC voltage level is high, the determination means 26 determines that a monitoring target object exists in a monitoring area corresponding to an alarm zone and performs surveillance situation monitoring. In addition, when the first DC voltage level is middle and the second DC voltage level is low, the determination means 26 determines that the monitoring state is normal. In addition, when the first DC voltage level is low and the second DC voltage level is high, the determination means 26 determines intrusion of a monitoring target object, and when the first DC voltage level is low and the second DC voltage level is low, the determination means 26 determines a false alarm caused by malfunction of the sensor and takes measures to perform maintenance of the sensor.

Furthermore, since the human body detection signal processing unit 24 configured in the transceiver 21 of the second Doppler radar 20 may detect fine movement such as breathing, it is possible to determine presence and approach of a monitoring target object even in a concealment, cover, or standstill situation of the monitoring target object.

As the first reception antenna Rx1 of the second Doppler radar 20 receives the signal transmitted from the first transmission antenna Tx1 of the first Doppler radar 10 by way of a monitoring distance d within a predetermined monitoring area and the signal transmitted from the second transmission antenna Tx2 of the second Doppler radar 20 and reflected by a monitoring target object within a predetermined monitoring area, and the security signal processing unit 23 and the human body detection signal processing unit 24 process the security surveillance IF signal and the Doppler IF signal in this way, it is possible to determine malfunction of the sensor, in addition to detection of approach or presence of the monitoring target object in the monitoring area. Accordingly, since it is possible to detect a human body, an animal, or an object approaching the monitoring area, and detect and determine a false alarm and malfunction of the sensor caused by environmental factors in the security surveillance state, security guard monitoring may be performed more efficiently.

Next, a second embodiment of the security surveillance microwave sensor having a reduced false report rate by means of biological signal detection according to the present invention will be described.

Figure 4:
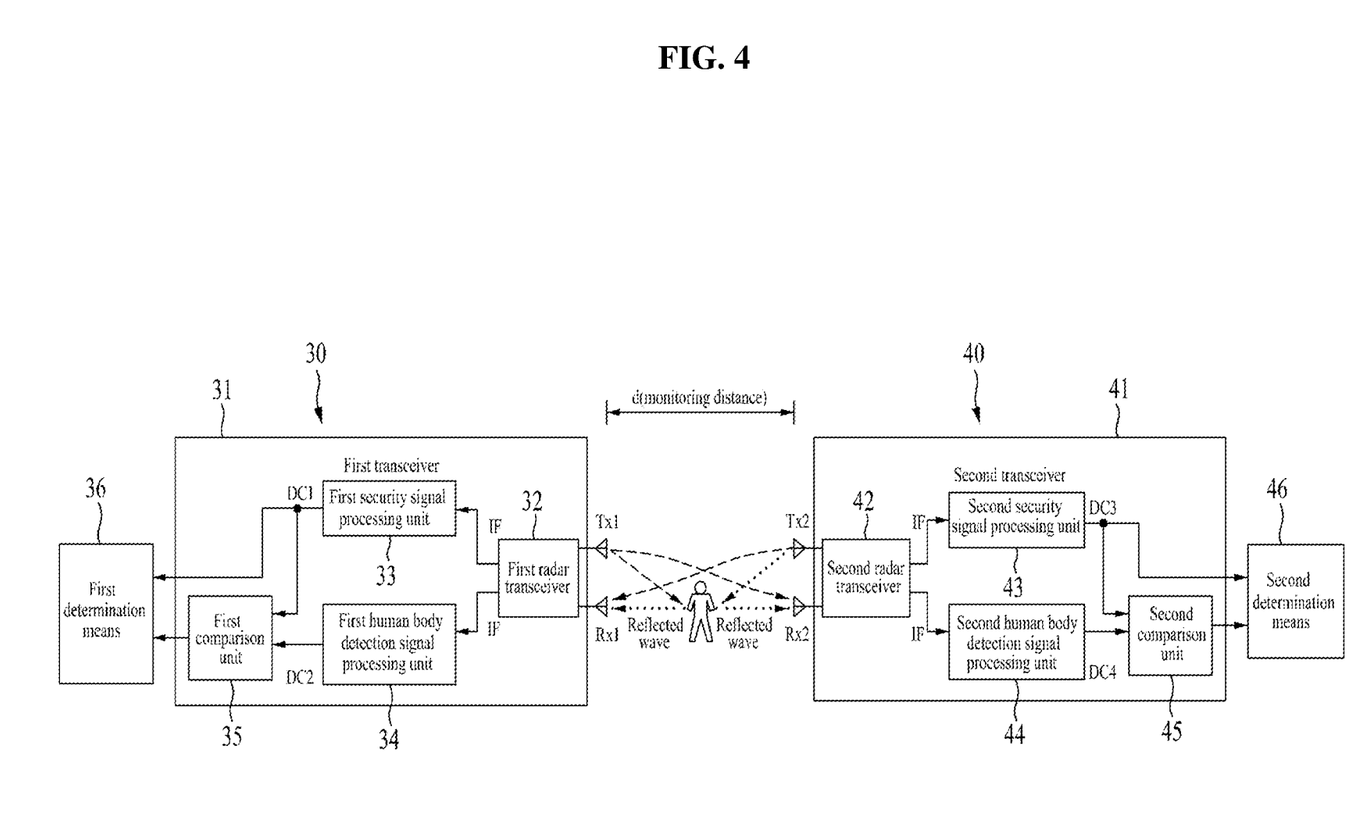
FIG. 4 is a block diagram showing a security surveillance microwave sensor having a reduced false report rate by means of biological signal detection as a second embodiment according to the present invention.

In FIG. 4, a third Doppler radar 30 and a fourth Doppler radar 40 are installed to be spaced apart from each other by a monitoring distance d set within a predetermined range for transmitting and receiving microwave frequencies. The third Doppler radar 30 and the fourth Doppler radar 40 are preferably installed to face each other.

The third Doppler radar 30 is installed to correspond to the fourth Doppler radar 40, and is configured of a first transceiver 31 for transmitting and receiving an oscillation frequency. A first radar transceiver 32 of the third Doppler radar 30 generates an oscillation frequency of a predetermined period using a voltage applied from the outside, amplifies the generated oscillation frequency to a predetermined magnitude, and transmits the oscillation frequency to the outside through the first transmission antenna Tx1. Then, the first transceiver 31 transmits and receives the signals transmitted from the first transmission antenna Tx1 of the third Doppler radar 30 and the second transmission antenna Tx2 of the fourth Doppler radar 40 through the first reception antenna Rx1.

A first security signal processing unit 33 processes a security surveillance IF signal transmitted from the second transmission antenna Tx2 of the second transceiver 41 and received through the first reception antenna Rx1 of the first radar transceiver 32, converts the IF signal to a first DC voltage level of a predetermined magnitude, and outputs the signal. Then, a first human body detection signal processing unit 34 processes a Doppler IF signal generated by a wave signal transmitted from the first transmission antenna Tx1, reflected by a detection target object approaching a monitoring area, and received through the first reception antenna Rx1 connected to the first radar transceiver 32, converts the IF signal to a second DC voltage level of a predetermined magnitude, and outputs the signal. Furthermore, the first radar transceiver 32 includes a filter for filtering the security surveillance IF signal and the Doppler IF signal to pass through a predetermined band, respectively.

A first comparison unit 35 of the third Doppler radar 30 compares the first DC voltage level input from the first security signal processing unit 33 with the second DC voltage level input from the first human body detection signal processing unit 34, and output a result value thereof.

In addition, a first determination means 36 is configured in the first transceiver 31 of the third Doppler radar 30, and the first determination means 36 determines a normal operating state or an abnormal state of the security surveillance microwave sensor, on the basis of a value output from the first comparison unit 35 by comparing the first DC voltage level with the second DC voltage level, and the first DC voltage level input from the first security signal processing unit 33.

On the other hand, the fourth Doppler radar 40 is installed to correspond to the third Doppler radar 30, and is configured of a second transceiver 41 for transmitting and receiving an oscillation frequency. A second radar transceiver 42 of the fourth Doppler radar 40 generates an oscillation frequency of a predetermined period using a voltage applied from the outside, amplifies the generated oscillation frequency to a predetermined magnitude, and transmits the oscillation frequency to the outside through the first transmission antenna Tx1. Then, the second transceiver 41 transmits and receives the signals transmitted from the first transmission antenna Tx1 of the third Doppler radar 30 and the second transmission antenna Tx2 of the fourth Doppler radar 40 through the second reception antenna Rx2.

A second security signal processing unit 43 processes a security surveillance IF signal transmitted from the first transmission antenna Tx1 of the first transceiver 31 and received through the second reception antenna Rx2 of the second radar transceiver 42, converts the IF signal to a third DC voltage level of a predetermined magnitude, and outputs the signal. Then, a second human body detection signal processing unit 44 processes a Doppler IF signal generated by a wave signal transmitted from the second transmission antenna Tx2, reflected by a detection target object approaching a monitoring area, and received through the second reception antenna Rx2 connected to the second radar transceiver 42, converts the IF signal to a second DC voltage level of a predetermined magnitude, and outputs the signal. Furthermore, the second radar transceiver 42 includes a filter for filtering the security surveillance IF signal and the Doppler IF signal to pass through a predetermined band, respectively.

A second comparison unit 45 of the fourth Doppler radar compares the third DC voltage level input from the second security signal processing unit 43 with a fourth DC voltage level input from the second human body detection signal processing unit 44, and output a result value thereof.

In addition, a second determination means 46 is configured in the second transceiver 41 of the fourth Doppler radar 40, and the second determination means 46 determines a normal operating state or an abnormal state of the security surveillance microwave sensor, on the basis of a value output from the second comparison unit 45 by comparing the third DC voltage level with the fourth DC voltage level, and the third DC voltage level input from the second security signal processing unit 43.

Furthermore, based on the signals received by the first determination means 36 and the second determination means 46, it will be possible to generate an alarm or perform monitoring according to intrusion, approach, or passage of an intruder within a monitoring area for a person in charge of a security surveillance control center or the like.

The operation of the security surveillance microwave sensor having a reduced false report rate by means of biological signal detection according to a second embodiment of the present invention configured as described above will be described.

First, an oscillated frequency signal is transmitted from the first transmission antenna Tx1 of the third Doppler radar 30 by way of a monitoring distance d within a predetermined monitoring area. The signal transmitted from the first transmission antenna Tx1 is received through the second reception antenna Rx2 of the fourth Doppler radar 40. In addition, the signal transmitted from the first transmission antenna is reflected by the monitoring target object within a predetermined monitoring area, and received through the first reception antenna Rx1.

Then, an oscillated frequency signal is transmitted from the second transmission antenna Tx2 of the fourth Doppler radar 40 by way of a monitoring distance d within a predetermined monitoring area. The signal transmitted from the second transmission antenna Tx2 is received through the first reception antenna Rx1 of the third Doppler radar 30. In addition, the signal transmitted from the second transmission antenna is reflected by the monitoring target object within a predetermined monitoring area, and received through the second reception antenna Rx2.

The first radar transceiver 32 configured in the first transceiver 31 of the third Doppler radar 30 filters the frequency signals received from the first transmission antenna Tx1 and the second transmission antenna Tx2 through the first reception antenna Rx1 through the filter. Then, the security surveillance IF signal separated by the first radar transceiver 32 is processed by the first security signal processing unit 33, and then converted and output as a first DC voltage level, and the Doppler IF signal reflected by a human body, an animal, or an object approaching the monitoring area is processed by the first human body detection signal processing unit 34 and then converted and output as a second DC voltage level.

In the first transceiver 31 of the third Doppler radar 30, when the first security signal processing unit 33 and the first human body detection signal processing unit 34 process the signals received through the first reception antenna Rx1 and output the signals as a first DC voltage level and a second DC voltage level, the first determination means 36 determines an abnormal state, on the basis of a value output from the first comparison unit 35 by comparing the first DC voltage level with the second DC voltage level, and the first DC voltage level input from the first security signal processing unit 33. Accordingly, the first determination means 36 may detect a monitoring target object approaching between the third Doppler radar 30 and the fourth Doppler radar 40 or determine malfunction of the sensor.

In addition, the second radar transceiver 42 configured in the second transceiver 41 of the fourth Doppler radar 40 filters the frequency signals received from the first transmission antenna Tx1 and the second transmission antenna Tx2 through the second reception antenna Rx2 through a filter. Then, the security surveillance IF signal separated by the second radar transceiver 42 is processed by the second security signal processing unit 43, and then converted and output as a third DC voltage level, and the Doppler IF signal reflected by a human body, an animal, or an object approaching the monitoring area is processed by the second human body detection signal processing unit 44 and then converted and output as a fourth DC voltage level.

In the second transceiver 41 of the fourth Doppler radar 40, when the second security signal processing unit 43 and the second human body detection signal processing unit 44 process the signals received through the second reception antenna Rx2, and output the signals at a third DC voltage level and a fourth DC voltage level, the second determination means 46 determines an abnormal state, on the basis of a value output from the second comparison unit 45 by comparing the third DC voltage level with the fourth DC voltage level, and the third DC voltage level input from the second security signal processing unit 43. Accordingly, the second determination means 46 may detect a monitoring target object approaching between the third Doppler radar 30 and the fourth Doppler radar 40 or determine malfunction of the sensor.

Figure 5:
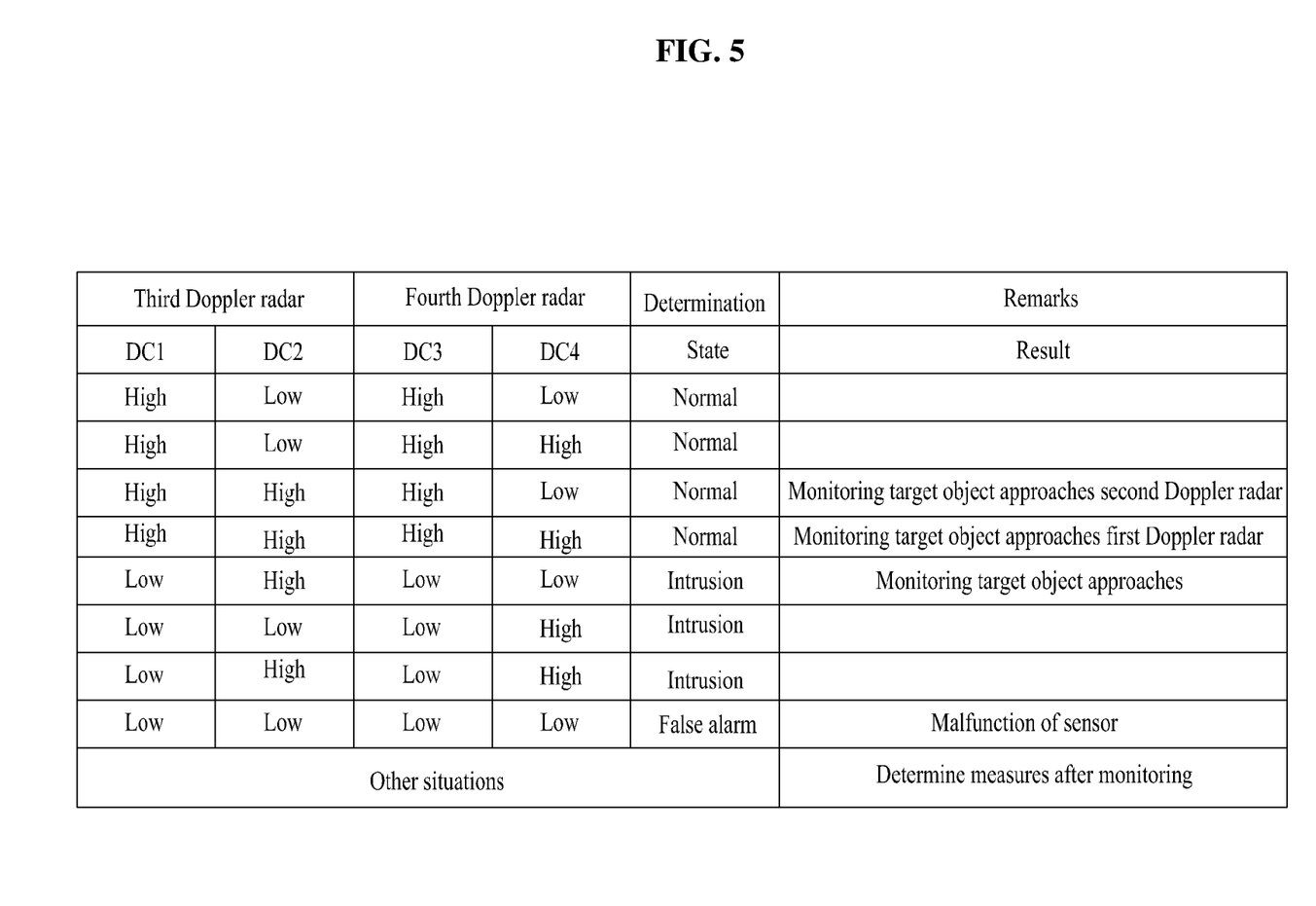
FIG. 5 is a table showing a result of determining a monitoring state by a first determination means and a second determination means based on a DC voltage level output from a first comparator and a second comparator in a security surveillance microwave sensor having a reduced false report rate by means of biological signal detection according to the present invention.

In FIG. 5, the first determination means 36 determines the monitoring state on the basis of a result value input from the first comparison unit 35, and the second determination means 46 determines the monitoring state on the basis of a result value input from the second comparison unit 45. That is, when the first DC voltage level is high, the second DC voltage level is low, the third DC voltage level is high, and the fourth DC voltage level is low, the first determination means 36 and the second determination means 46 determine as a normal monitoring state. In addition, when the first DC voltage level is high, the second DC voltage level is low, the third DC voltage level is high, and the fourth DC voltage level is high, the first determination means 36 and the second determination means 46 determine as approach of a monitoring target object to the second Doppler radar 20. In addition, when the first DC voltage level is high, the second DC voltage level is high, the third DC voltage level is high, and the fourth DC voltage level is low, the first determination means 36 and the second determination means 46 determine as approach of a monitoring target object to the first Doppler radar 10. In addition, when all the first to fourth DC voltage levels are high, the first determination means 36 and the second determination means 46 determine as approach of a monitoring target object such as a human body, an animal, or a large object within a monitoring distance, and when the first DC voltage level is low, the second DC voltage level is high, the third DC voltage level is low, and the fourth DC voltage level is low, the first determination means 36 and the second determination means 46 determine as intrusion of a monitoring target object. Furthermore, when all the first to fourth DC voltage levels are low, the first determination means 36 and the second determination means 46 determine as a false alarm caused by malfunction of the sensor, and take measures to perform maintenance of the sensor. In addition, when the first to fourth DC voltage levels are not high or low, the first determination means 36 and the second determination means 46 will determine as a normal state, or appropriate measures will be determined after monitoring by a monitoring person.

Furthermore, since the first human body detection signal processing unit 34 configured in the first transceiver 31 of the third Doppler radar 30 and the second human body detection signal processing unit 44 configured in the second transceiver 41 of the fourth Doppler radar 40 may detect fine movement such as breathing, it is possible to determine presence and approach of a monitoring target object even in a concealment, cover, or standstill situation of the monitoring target object.

As the first reception antenna Rx1 of the third Doppler radar 30 and the second reception antenna Rx2 of the fourth Doppler radar 40 receive the signals transmitted from the first transmission antenna Tx1 of the third Doppler radar 30 and the second transmission antenna Tx2 of the fourth Doppler radar 40 by way of a monitoring distance d within a predetermined monitoring area and the signals reflected by a monitoring target object within a predetermined monitoring area, and the first security signal processing unit 33 and the second security signal processing unit 43, and the first human body detection signal processing unit 34 and the second human body detection signal processing unit 44 process the security surveillance IF signal and the Doppler IF signal in this way, it is possible to determine malfunction of the sensor, in addition to detection of approach or presence of the monitoring target object in the monitoring area. Accordingly, since it is possible to detect a human body, an animal, or an object approaching the monitoring area, and detect and determine a false alarm and malfunction of the sensor caused by environmental factors in the security surveillance state, security guard monitoring may be performed more efficiently.

Furthermore, in the second embodiment of the present invention, as the first transceiver 31 and the second transceiver 41 for detecting human bodies and processing security signals are installed as a pair, the monitoring distance of performing the security surveillance may be further extended. In addition, as the monitoring distance is extended, a monitoring state may be managed precisely by double-checking so that the pair of sensors may transmit and receive security signals to and from each other, and a false alarm or a malfunction state of the sensor may be further distinguished.

Accordingly, since the security surveillance microwave sensor having a reduced false report rate by means of biological signal detection of the present invention is able to set a specific IF frequency band disturbed by a human body, and simply amplify the IF frequency or convert change in the voltage level (peak to peak) into displacement of a DC voltage in order to extend the monitoring distance d, there is an advantage in that a reduced false report rate can be expected compared with existing microwave sensors.

Although the present invention has been shown and described in relation to specific embodiments in the above description, those skilled in the art may easily know that various modifications and changes are possible without departing from the spirit and scope of the present invention as defined by the claims.

The invention claimed is:

1. A security surveillance microwave sensor having a reduced false report rate using biological signal detection, the security surveillance microwave sensor comprising:
   a first Doppler radar including a transmitter to generate an oscillation frequency of a predetermined period using a first voltage, to amplify the generated oscillation frequency to a predetermined magnitude, and to transmit the amplified oscillation frequency through a first transmission antenna; and
   a second Doppler radar including a transceiver including:
   a radar transceiver to generate a second oscillation frequency of a second predetermined period using a second voltage, to amplify the second generated oscillation frequency to a second predetermined magnitude, and to transmit and receive signals transmitted from the first transmission antenna and a second transmission antenna through a first reception antenna,
   a security signal processor to process a security surveillance intermediate frequency (IF) signal converted from the amplified oscillation frequency transmitted from the first transmission antenna and received through the first reception antenna, to convert the security surveillance IF signal to a first DC voltage level of a predetermined magnitude, and to output the first DC voltage level,
   a human body detection signal processor to process a Doppler IF signal generated by a wave signal transmitted from the second transmission antenna, reflected by a monitoring target object approaching a predetermined monitoring area, and received through the first reception antenna of the radar transceiver, to convert the Doppler IF signal to a second DC voltage level of a predetermined magnitude, and to output the second DC voltage level, and
   a comparator to compare the first DC voltage level input from the security signal processor with the second DC voltage level input from the human body detection signal processor, and to output a result value, wherein:
   the first reception antenna receives the amplified oscillation frequency transmitted from the first transmission antenna by way of a monitoring distance d within the predetermined monitoring area and the signal transmitted from the second transmission antenna and reflected by the monitoring target object within the predetermined monitoring area, and
   the security signal processor and the human body detection signal processor detect the monitoring target object that approaches or maintains a fine movement or a standstill state, and determine malfunction of the security surveillance microwave sensor.

2. The security surveillance microwave sensor according to claim 1, further comprising a determiner to determine an abnormal state based on the result value output from the comparator, and the first DC voltage level input from the security signal processor.

3. The security surveillance microwave sensor according to claim 2, wherein:
   the determiner determines a monitoring state based on the result value output from the comparator and input into the determiner, and
   the determiner determines the monitoring state
      as approach of the monitoring target object when the first DC voltage level is high and the second DC voltage level is high,
      as a normal monitoring state when the first DC voltage level is high and the second DC voltage level is low,
      as a state in which the monitoring target object exists in the predetermined monitoring area when the first DC voltage level is middle and the second DC voltage level is high,
      as a normal monitoring state when the first DC voltage level is middle and the second DC voltage level is low, as intrusion of the monitoring target object when the first DC voltage level is low and the second DC voltage level is high, and
      as a false alarm caused by malfunction of the security surveillance microwave sensor when the first DC voltage level is low and the second DC voltage level is low.

4. The security surveillance microwave sensor according to claim 1, wherein the radar transceiver includes a filter to filter the security surveillance IF signal and the Doppler IF signal to pass through a predetermined band, respectively.

5. A security surveillance microwave sensor having a reduced false report rate using biological signal detection, the security surveillance microwave sensor comprising:
   a first Doppler radar including a first transceiver including:
   a first radar transceiver to generate an oscillation frequency of a predetermined period using a first voltage, to amplify the generated oscillation frequency to a predetermined magnitude, to transmit the amplified oscillation frequency through a first transmission antenna, and to transmit and receive a radio wave signal transmitted from the first transmission antenna and reflected by a detection target object and a signal transmitted from a second transmission antenna of a second transceiver through a first reception antenna,
   a first security signal processor to process a security surveillance intermediate frequency (IF) signal transmitted from the second transmission antenna of a second radar transceiver of the second transceiver and received through the first reception antenna of the first radar transceiver, to convert the security surveillance IF signal received through the first reception antenna to a first DC voltage level of a predetermined magnitude, and to output the first DC voltage level,
   a first human body detection signal processor to process a Doppler IF signal generated by the radio wave signal transmitted from the first transmission antenna, reflected by the detection target object approaching a predetermined monitoring area, and received through the first reception antenna of the first radar transceiver, to convert the Doppler IF signal received through the first reception antenna to a second DC voltage level of a predetermined magnitude, and to output the second DC voltage level, and
   a first comparator to compare the first DC voltage level input from the first security signal processor with the second DC voltage level input from the first human body detection signal processor, and to output a first result value; and
   a second Doppler radar including the second transceiver including:
   the second radar transceiver to generate a second oscillation frequency of a second predetermined period using a second voltage, to amplify the second generated oscillation frequency to a second predetermined magnitude, to transmit the second amplified oscillation frequency through the second transmission antenna, and to transmit and to receive a reflected wave signal transmitted from the second transmission antenna and reflected by the detection target object and a signal transmitted from the first transmission antenna of the first transceiver through the second reception antenna,
   a second security signal processor to process a security surveillance IF signal transmitted from the first transmission antenna of the first transceiver and received through the second reception antenna of the second radar transceiver, to convert the security surveillance IF signal received through the second reception antenna to a third DC voltage level of a predetermined magnitude, to output the third DC voltage level,
   a second human body detection signal processor to process a Doppler IF signal generated by a wave signal transmitted from the second transmission antenna, reflected by the detection target object approaching the predetermined monitoring area, and received through the second reception antenna of the second radar transceiver, to convert the Doppler IF signal received through the second reception antenna to a fourth DC voltage level of a predetermined magnitude, and to output the fourth DC voltage, and
   a second comparator to compare the third DC voltage level input from the second security signal processor with the fourth DC voltage level input from the second human body detection signal processor, and outputting a second result value,
   wherein in order to allow the first human detection signal processor and the second human body detection signal processor to detect a Doppler IF signal of the detection target object in the monitoring distance d within the predetermined monitoring area, the first reception antenna and the second reception antenna receive signals transmitted from the first transmission antenna and the second transmission antenna by way of the monitoring distance d within the predetermined monitoring area, and signals transmitted from the first transmission antenna and the second transmission antenna and reflected by the detection target object within the predetermined monitoring area, and the first security signal processor and the first human body detection signal processor, and the second security signal processor and the second human body detection signal processor to process the signals, detect the detection target object that approaches or maintains a fine movement or a standstill state, and determine malfunction of the security surveillance microwave sensor.

6. The security surveillance microwave sensor according to claim 5, wherein the security surveillance microwave sensor further comprises:
   a first determiner to determiner an abnormal state based on a first value output from the first comparator by comparing the first DC voltage level with the second DC voltage level, and the first DC voltage level input from the first security signal processor; and
   a second determiner to determine an abnormal state based on the second result value output from the second comparator by comparing the third DC voltage level with the fourth DC voltage level, and the third DC voltage level input from the second security signal processor.

7. The security surveillance microwave sensor according to claim 6, wherein:
   the first determiner determines a monitoring state based on the first result value input from the first comparator,
   the second determiner determines the monitoring state based on the second result value input from the second comparator, and
   the first determiner and the second determiner determine the monitoring state
      as a normal monitoring state when the first DC voltage level is high, the second DC voltage level is low, the third DC voltage level is high, and the fourth DC voltage level is low,
      as approach of the detection target object to the second Doppler radar when the first DC voltage level is high, the second DC voltage level is low, the third DC voltage level is high, and the fourth DC voltage level is high,
      as approach of the detection target object to the first Doppler radar when the first DC voltage level is high, the second DC voltage level is high, the third DC voltage level is high, and the fourth DC voltage level is low, as approach of the detection target object when all the first to fourth DC voltage levels are high, as intrusion of the detection target object when the first DC voltage level is low, the second DC voltage level is high, the third DC voltage level is low, and the fourth DC voltage level is low, and as a false alarm caused by malfunction of the security surveillance microwave sensor when all the first to fourth DC voltage levels are low.

8. The security surveillance microwave sensor according to claim 5, wherein the first radar transceiver and the second radar transceiver include a filter to filter the security surveillance IF signal and the Doppler IF signal to pass through a predetermined band, respectively.

* * * * *